Nov. 4, 1947.  S. M. POWARZYNSKI  2,430,248
TANDEM WHEEL MOUNTING
Filed Jan. 17, 1945  2 Sheets-Sheet 1
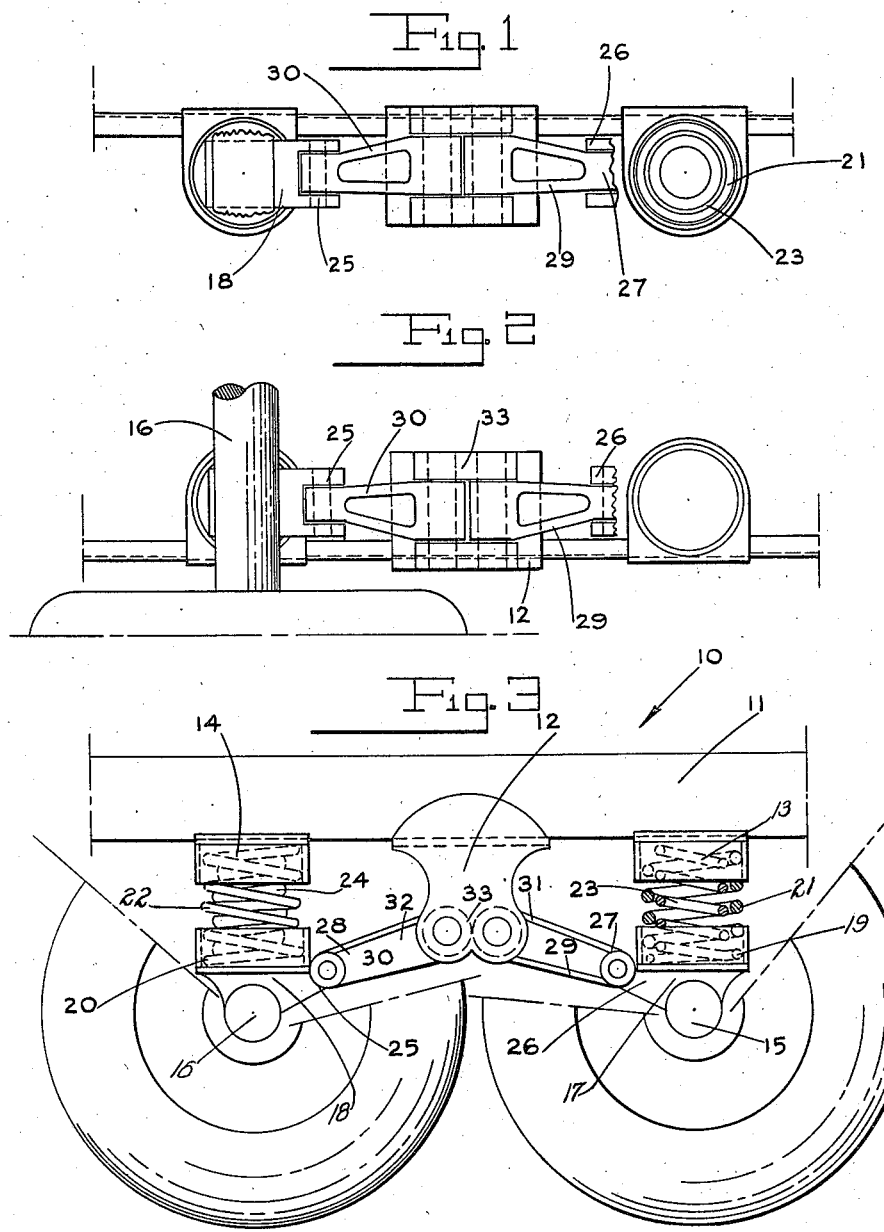
Inventor
STANLEY M. POWARZYNSKI
By Clarence A. O'Brien
and Harvey B. Jacobson
Attorney

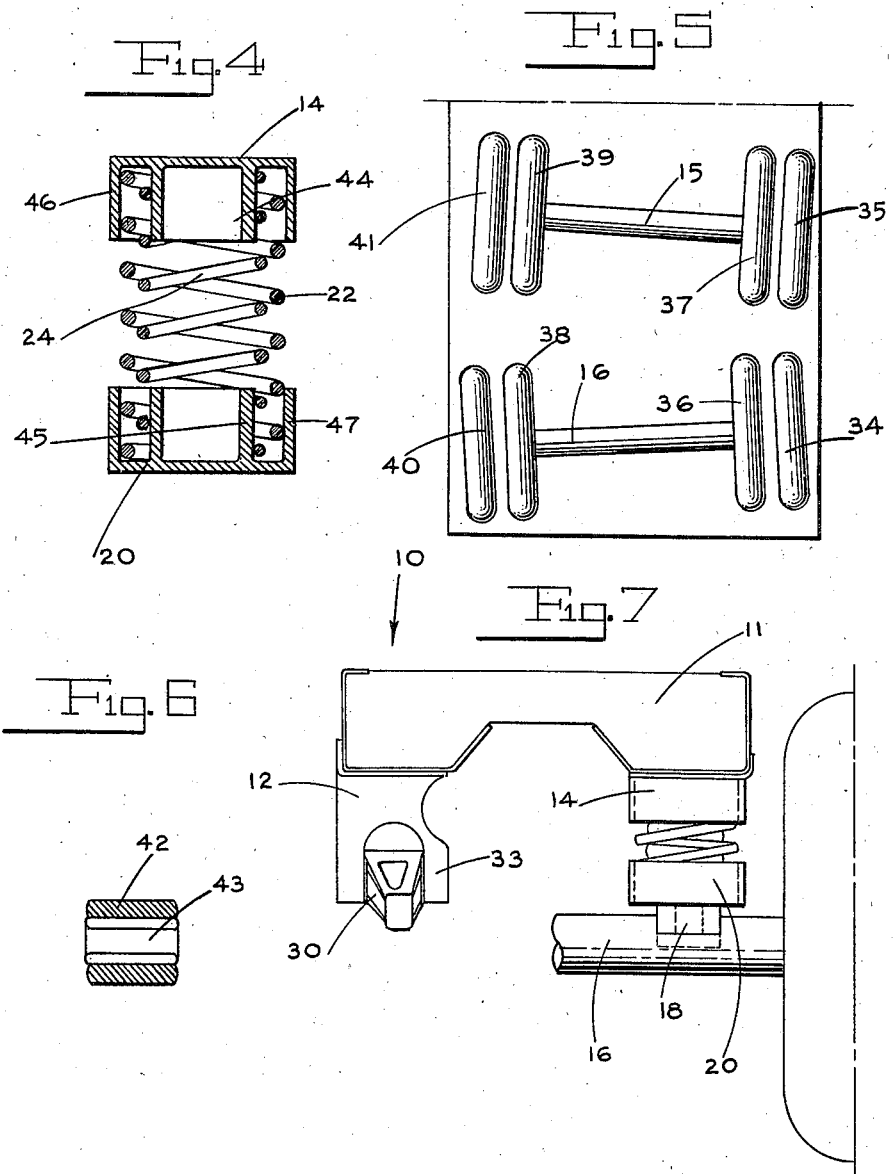

Patented Nov. 4, 1947

2,430,248

UNITED STATES PATENT OFFICE 2,430,248

TANDEM WHEEL MOUNTING

Stanley M. Powarzynski, Chicago, Ill.

Application January 17, 1945, Serial No. 573,173

2 Claims. (Cl. 280—124)

This invention relates to automotive vehicles and has for its object to provide a tandem wheel mounting specially adapted for trailers.

A principal object of the invention is to provide an easy steering mounting for tandem wheels so arranged as to produce a minimum of wear upon the wheel tires.

Another object of the invention is to provide in a tandem wheel mounting a knee action effect.

A further object of the invention is to provide a tandem wheel mounting in each wheel axle which operates upon its own coil springs, thus providing a much smoother travel over rough roads.

And another object of the invention is to provide a tandem wheel mounting of great flexibility and stability.

Other features and advantages will become more readily apparent from the following description and the accompanying illustrative drawings in which:

Figure 1 is a top plan view of my mounting,

Figure 2 is a bottom plan view thereof,

Figure 3 is a side elevational view of the same,

Figure 4 is a detail vertical sectional view of a spring assembly,

Figure 5 is a diagrammatic view of a truck wheel assembly,

Figure 6 is a detail section of a bearing, and

Figure 7 is an end elevational view of the mounting, shown partly broken away.

In the accompanying drawings as above enumerated and in the following specification, like characters of reference indicate like parts throughout and in which 10, indicates my improved wheel mounting in which 11, is a chassis frame member to which is fixed a hanger bracket 12, located centrally between a pair of spaced apart inverted cups 13 and 14, also fixed to the member 11. Welded or otherwise fixed to the axles 15 and 16, are brackets 17 and 18, on which are integrally formed cups 19 and 20, in vertical alignment with the cups 13 and 14 respectively. Seated within these cups are coiled springs 21 and 22, and mounted within said springs are overload coil springs 23 and 24.

Pivotally connected to the upwardly inclined bracket arms 25 and 26, are the outer ends 27 and 28, of radius members 29 and 30, the inner ends 31 and 32 of which are pivotally connected to the lower end 33, of the hanger 12. The above described wheel mounting is, of course, duplicated for each tandem set of wheels 34 and 35, 36 and 37, 38 and 39 and 40 and 41. The several bearing members 42 are provided with bushings 43 for the several pivot pins supporting the radius members 29 and 30. The cups 14, 20, etc., are each provided with inner reduced cylinders 44 and 45, between which and the outer walls 46 and 47, of said cups the springs 22, 24, etc., seat.

In the above described arrangement of tandem wheel mountings, in making turns on curves, the momentum of speed will cause the weight of the truck to shift opposite to the turn being made. For instance, when a trailer is making a right turn, the weight is shifted to the left side of trailer, causing the wheels on that side of the trailer to spread apart (see Figure 5, in the drawings) which action causes the wheels on the right side to come closer together, thus a complete turn can be made without dragging or scraping the tires on the road bed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a wheel mounting including a pair of spaced apart axles, spaced apart brackets integral therewith adjacent to their ends, a trailer chassis, hangers thereon, radius members pivoted to the brackets and to said hangers, cups formed on said brackets, opposing cups fixed to the chassis and springs seated within said cups, and said cups being provided with inner cylinders between which and the walls of the cups said springs are seated.

2. In a wheel mounting including a pair of spaced apart axles, spaced apart brackets integral therewith adjacent to their ends, a trailer chassis, hangers thereon, radius members pivoted to the brackets and to said hangers, cups formed on said brackets, opposing cups fixed to the chassis, and springs seated within said cups.

STANLEY M. POWARZYNSKI.

REFERENCES CITED

The following references are of record in the file of this patent:

UNITED STATES PATENTS

| Number | Name | Date |
|---|---|---|
| 2,190,368 | Morgan | Feb. 13, 1940 |
| 1,845,678 | Norton | Feb. 16, 1932 |

FOREIGN PATENTS

| Number | Country | Date |
|---|---|---|
| 537,526 | France | Mar. 6, 1922 |